(12) United States Patent
Smith

(10) Patent No.: US 11,207,606 B2
(45) Date of Patent: Dec. 28, 2021

(54) SYSTEMS AND METHODS FOR REACTIVE PROJECTION-MAPPED SHOW ROBOT

(71) Applicant: Universal City Studios LLC, Universal City, CA (US)

(72) Inventor: Michelle Elizabeth Smith, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 8 days.

(21) Appl. No.: 16/806,722

(22) Filed: Mar. 2, 2020

(65) Prior Publication Data

US 2021/0268393 A1  Sep. 2, 2021

(51) Int. Cl.
*A63G 31/02* (2006.01)
*G06F 3/01* (2006.01)
*B25J 11/00* (2006.01)

(52) U.S. Cl.
CPC ........... *A63G 31/02* (2013.01); *B25J 11/0035* (2013.01); *G06F 3/011* (2013.01)

(58) Field of Classification Search
CPC ........ A63G 25/00; A63G 31/00; A63G 31/02; A63G 31/16; A63F 13/00; G06F 17/00; G06F 19/00; G06F 3/00; G06F 3/011
USPC ...................... 472/43, 59, 60, 61, 130; 463/2
See application file for complete search history.

(56) References Cited

U.S. PATENT DOCUMENTS

| 5,325,473 A | 6/1994 | Monroe et al. |
| 5,716,281 A * | 2/1998 | Dote ........................ F41J 9/14 463/2 |
| 5,852,672 A | 12/1998 | Lu |
| 7,955,168 B2 * | 6/2011 | Mendelsohn ............ A63G 1/00 463/2 |
| 8,376,869 B2 * | 2/2013 | Bloom ...................... A63G 5/00 472/43 |
| 8,751,049 B2 | 6/2014 | Linder et al. |
| 9,300,901 B2 | 3/2016 | Grundhofer et al. |

(Continued)

FOREIGN PATENT DOCUMENTS

| WO | 2018224847 | 12/2018 |
| WO | 2019168937 A1 | 9/2019 |

OTHER PUBLICATIONS

Full 3D Audio-Animatronics in Seven Dwarfs Mine Train | Walt Disney World, https://www.youtube.com/watch?v=I-PV4PsRCgo.

(Continued)

*Primary Examiner* — Kien T Nguyen
(74) *Attorney, Agent, or Firm* — Fletcher Yoder, P.C.

(57) ABSTRACT

An amusement attraction provides a reactive game experience to a guest. The amusement attraction includes a robot control system having a show robot and a robot controller communicatively coupled to the show robot. The robot controller is configured to instruct the show robot to execute a baseline performance, which is predetermined and stored within the robot controller. The robot controller is configured to receive game input from an input device and instruct the show robot to interrupt the baseline performance by executing a reactive performance comprising a sequence of reactive actions that is responsive to the game input. Additionally, the robot controller is configured to instruct the show robot to execute a connective performance that links an end of the sequence of the reactive actions back to the baseline performance.

18 Claims, 5 Drawing Sheets

(56) References Cited

U.S. PATENT DOCUMENTS

| | | | |
|---|---|---|---|
| 9,463,379 B1 | 10/2016 | Brister et al. | |
| 9,472,011 B2 | 10/2016 | Linnell | |
| 9,958,767 B1 | 5/2018 | Reichow et al. | |
| 10,131,171 B2 | 11/2018 | Sumikawa et al. | |
| 10,289,194 B2* | 5/2019 | McCracken | G02B 27/017 |
| 2008/0013826 A1 | 1/2008 | Hillis et al. | |
| 2009/0069935 A1 | 3/2009 | Wieland | |
| 2013/0120547 A1 | 5/2013 | Linnell | |
| 2015/0154783 A1 | 6/2015 | Grundhofer et al. | |
| 2015/0190726 A1 | 7/2015 | Frolov | |
| 2017/0021282 A1 | 1/2017 | Comploi | |
| 2017/0200313 A1 | 7/2017 | Lee et al. | |
| 2018/0213195 A1 | 7/2018 | Junuzovic et al. | |
| 2019/0224579 A1 | 7/2019 | Hall et al. | |
| 2021/0016191 A1 | 1/2021 | Boyle et al. | |

OTHER PUBLICATIONS

Box, https://www.youtube.com/watch?v=IX6JcybgDFo.

Box by Bot & Dolly | Behind the Scenes, https://www.youtube.com/watch?v=y4ajXJ3nj1Q.

Dynamic projection mapping onto deforming non-rigid surface, https://www.youtube.com/watch?v=-bh1MHuA5jU.

Dynamic Projection Mapping; Now and the Future at Ishikawa Watanabe Laboratory, https://www.youtube.com/watch?v=Ca8SmIDjPOY.

Real Time Tracking & Projection Mapping (Full ver.), https://www.youtube.com/watch?v=XkXrLZmnQ_M.

PCT/US2021/020325 International Search Report and Written Opinion dated Jun. 15, 2021.

\* cited by examiner

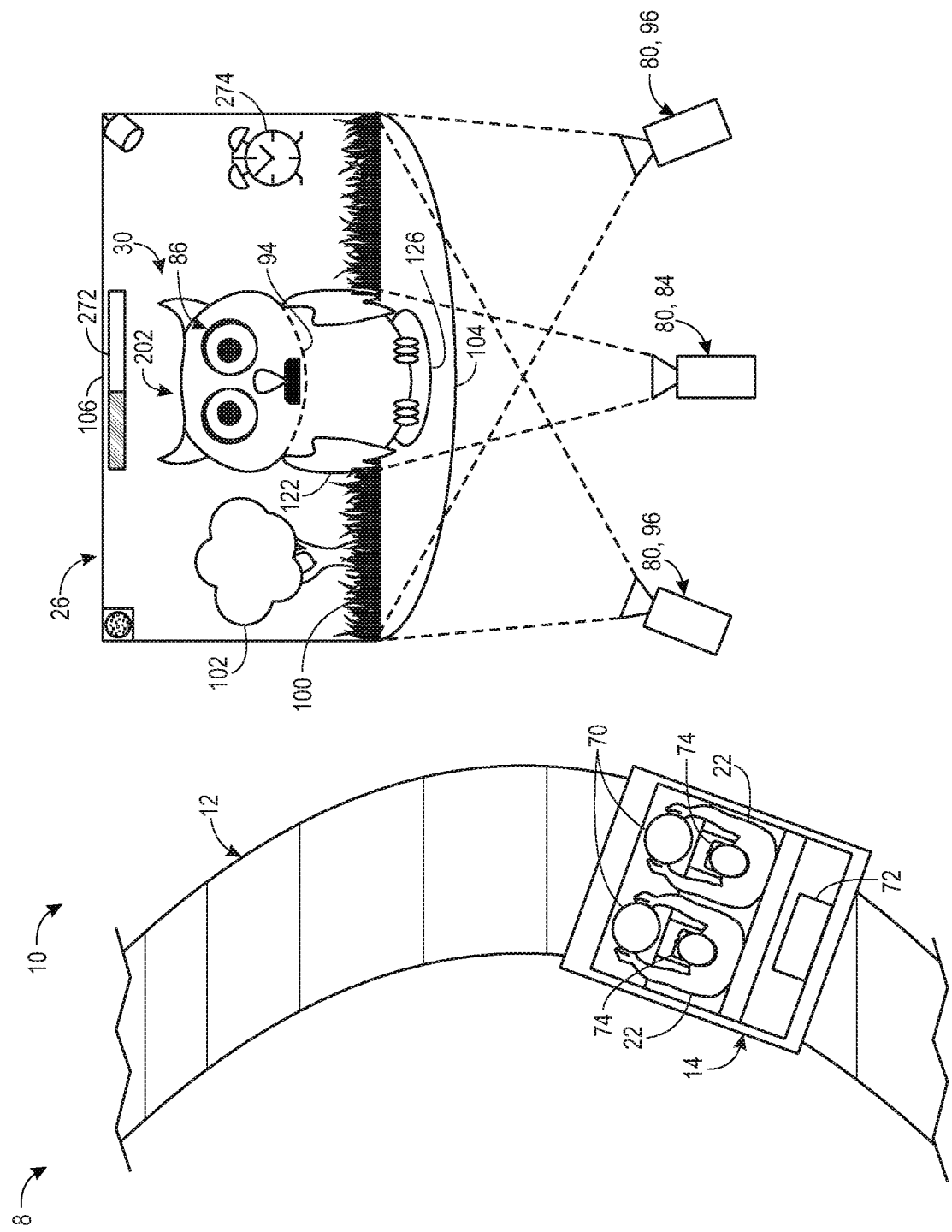

SYSTEMS AND METHODS FOR REACTIVE PROJECTION-MAPPED SHOW ROBOT

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an amusement park may provide an amusement attraction including a show robot or animated figure to entertain park guests. For example, an attraction may include a ride that enables the park guests to travel within a ride vehicle along a ride path and view one or more show robots. Certain amusement rides may include a show robot positioned alongside the ride path to contribute to a theme of the amusement rides. Indeed, in an amusement ride, the show robot may be provided as a focal point, while repetitively performing the same sequence of actions for each ride vehicle that passes the show robot. For example, the show robot may move through certain preprogrammed positions to provide the same experience to each park guest, such as an experience emulating a movie scene. However, because the performance provided by the show robot may be unchanged over time, a demand for revisiting the amusement attraction or ride thereof may be reduced. Accordingly, it is now recognized that is desirable to further engage the park guests with the show robot, such as by enabling the park guests to interact with and change the performance of the show robot.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an amusement attraction provides a reactive game experience to a guest. The amusement ride has a robot control system that includes a show robot and a robot controller communicatively coupled to the show robot. The robot controller is configured to instruct the show robot to execute a baseline performance, which is predetermined and stored within the robot controller. The robot controller is configured to receive game input from an input device and instruct the show robot to interrupt the baseline performance by executing a reactive performance comprising a sequence of reactive actions that is responsive to the game input. Additionally, the robot controller is configured to instruct the show robot to execute a connective performance that links an end of the sequence of the reactive actions back to the baseline performance.

In an embodiment, an amusement ride for providing a reactive game experience includes a ride vehicle configured to transport a guest to a position for viewing a show set of the amusement ride. The ride vehicle includes an input device and a game controller communicatively coupled to the input device to receive game input therefrom. The amusement ride also includes a show robot disposed within the show set and a robot controller communicatively coupled to the show robot and the game controller. The robot controller is configured to instruct the show robot to initiate a baseline performance and receive the game input from the game controller after the show robot initiates the baseline performance. Additionally, the robot controller is configured to generate a reactive and connective performance that causes the show robot to deviate from the baseline performance, perform a sequence of reactive actions that is responsive to the game input, and return to the baseline performance. The robot controller is also configured to instruct the show robot to execute the reactive and connective performance.

In an embodiment, a method of controlling a robot control system provides a reactive game experience within an amusement ride. The method includes instructing, via a robot controller of the robot control system, a show robot to execute a baseline performance in response to initiation of a game cycle associated with a ride vehicle of the amusement ride. The method includes receiving, via the robot controller, game input from a game controller associated with the ride vehicle. The game input corresponds to activation of an input device of the ride vehicle. The method also includes generating, via the robot controller, a reactive performance that includes a sequence of reactive actions in response to receiving the game input. The method includes generating, via the robot controller, a connective performance that links an end of the sequence of the reactive actions back to the baseline performance. Additionally, the method includes instructing, via the robot controller, the show robot to interrupt the baseline performance by executing the reactive performance followed by the connective performance.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 5 is a schematic diagram illustrating an embodiment of the projection-mapped show robot executing a connective performance, thereby transitioning from the reactive performance of FIG. 4 back to the baseline performance of FIG. 1, in accordance with embodiments of the present disclosure.

DETAILED DESCRIPTION

Figure 1:
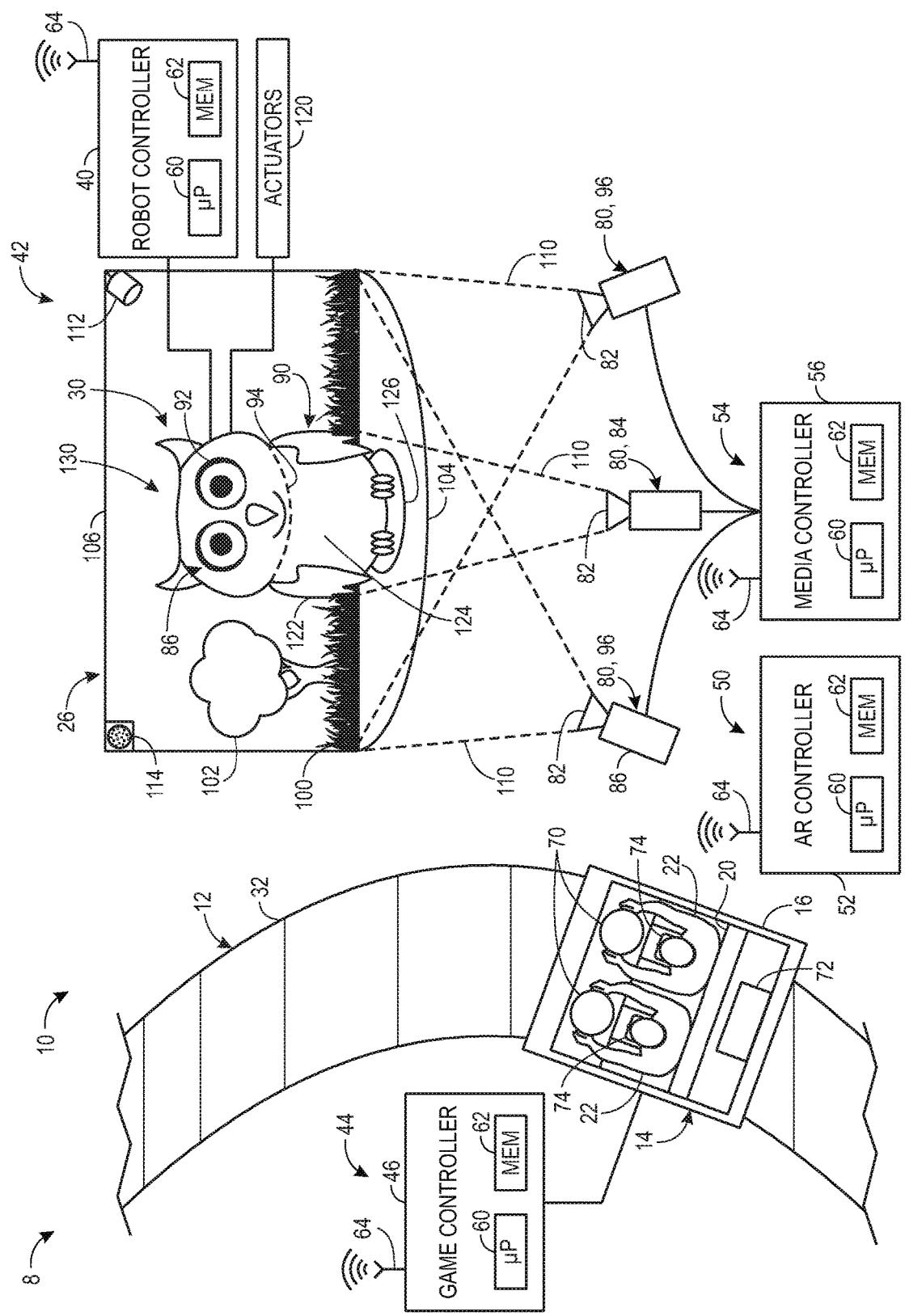
FIG. 1 is a schematic diagram illustrating an embodiment of an amusement attraction having a reactive, projection-mapped show robot that displays a baseline performance in view of guests having input devices, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As a preliminary matter, certain terminology will be used in the following discussion to describe aspects of a show set, such as operation of a show robot. The terminology has a meaning that will be plainly understood based on the face of the language and/or from the context in which the language is provided. For example, as used herein, a "baseline performance" refers to a predetermined (e.g., stored, static) sequence of actions that the show robot executes at a beginning of a game cycle and/or in the absence of game input associated with a reactive game experience. As used herein, a "reactive performance" refers to a dynamically generated sequence of reactive actions that the show robot executes in response to specific parameters of game input, such that the reactive performance is generated on demand, or "reactively," in response to the received game input. Further, as used herein, a "connective performance" refers to a dynamically generated or selected sequence of connective actions that is determined based on the game input and/or the reactive performance to smoothly link, or "connect," an end of the reactive performance back to the baseline performance. For example, the sequence of connective actions may transition the show robot from a last reactive action of the sequence of reactive actions back to a particular, interrupted action of the baseline performance from which the reactive performance begins.

Present embodiments are directed to an attraction (e.g., amusement attraction) having a show set with a reactive, projection-mapped show robot, which may interact with guests. In an embodiment, the attraction is a ride system that enables such interactions as guests are carried along a ride path by a ride vehicle. In particular, a game control system (e.g., main control system) of the attraction may coordinate with a robot control system having the show robot to instruct the show robot to interactively provide a reactive game experience to the guests. For example, as the guests or the ride vehicle approaches the show set, the robot control system may instruct the show robot to begin a baseline performance that includes a standard or initial set of actions, such as positioning and/or motions of the show robot. Additionally, the guests or the ride vehicle may be equipped with input devices (e.g., game input devices) of the game control system that accept game input from the guests to further enhance guest enjoyment within the attraction. As such, in response or reaction to the robot control system receiving the game input from the game control system, the robot control system generates an adjusted, reactive performance to the game input to interrupt the baseline performance of the show robot. As discussed in detail below, the reactive performance may be particularly tailored to specific qualities of the game input, such as a targeted location, an originating input device, an associated ride vehicle, and so forth. Further, the robot control system generates a connective performance to transition the show robot from an end point of the reactive performance back to the baseline performance, such as a point from which the baseline performance was interrupted or a subsequent point that is after the interrupted point. Therefore, with the reactive and connective performances determined, the robot control system may instruct the show robot to react to the game input and return to the baseline performance, thus enabling the guests to continuously engage with the reactive show robot during the reactive game experience.

To provide a further layer of immersion within the reactive game experience, the attraction may include an augmented reality (AR) system that provisions the guests with wearable visualization devices (e.g., AR headsets). The wearable visualization devices may render AR objects within guest view to represent the game input that the guests provide via the input devices. For example, in situations in which the guest activates an input device corresponding to launching a projectile at a target portion of the show robot, the wearable visualization device may generate an AR object of the projectile (e.g., virtual projectile object) that appears to travel to the target portion selected by the guest. Further, the attraction may include a media control system that projection maps media onto a body or form of the show robot to facilitate efficient adjustment of an appearance of the show robot, which is continually responsive to the game input provided to the media control system by the game control system. Until a predetermined time window has elapsed or another suitable end condition is met (e.g., a threshold number of game inputs received), the robot control system may continue to receive game input from the game control system, interrupt the baseline performance with corresponding reactive and connective performances, and return to the baseline performance, while the AR control system and the media system provide corresponding supplemental media. Then, at the conclusion of the reactive game experience, the game control system may coordinate the presentation of an end of game performance. Accordingly, the game control system, the robot control system, the media control system, and/or the AR control system may each cooperate to provide dynamic and interactive gameplay experiences between the guests and the show robot, as discussed herein. Compared to show robots that may repetitively present a same show experience to guests, the reactive, projection-mapped show robot disclosed herein may provide more unique and dynamic performances that draw guests back to the attraction for novel, reactive game experiences again and again.

Keeping the above brief summary in mind, FIG. 1 is a schematic illustration of an attraction 8 (e.g., amusement attraction), which may be embodied as an amusement ride 10 having a ride path 12 and a ride vehicle 14. As illustrated, the ride vehicle 14 includes a vehicle body 16 having seats 20 to carry guests 22 along the ride path 12 and to a position that facilitates viewing of a show set 26 (e.g., habitat) having a reactive, projection-mapped show robot 30. The reactive, projection-mapped show robot 30 may be referred to as the show robot 30 and may include an actuatable character, device, or feature with a system for projection mapping characteristics of the character, device, or feature. The ride path 12 may include tracks 32 or other suitable infrastructure to direct motion of the ride vehicle 14 to and from the show set 26. To provide sufficient time for the guests 22 to interact with the show robot 30, the ride vehicle 14 may stop along the ride path 12 and/or travel at a reduced speed in view of the show set 26 (e.g., compared to a speed of the ride vehicle 14 during other portions of the amusement ride 10). In some embodiments, the ride vehicle 14 may be controlled by the guests 22 (e.g., via a steering wheel and/or gas pedal) to enable the guests 22 to direct the motion of the ride vehicle 14. It should be understood that the ride vehicle 14 may have additional or alternative features that enable any suitable number of guests 22 to traverse the ride path 12. Additionally, although illustrated and discussed herein with reference to the attraction 8 including the amusement ride 10 having a ride vehicle 14, it should be understood that the attraction 8 may alternatively exclude the ride vehicle 14, such that the guests 22 may walk or otherwise travel to the show set 26 to interact with the show robot 30 within the attraction 8.

Based on coordinated operation of components of the attraction 8, the show robot 30 provides an engaging, reactive game experience to the guests 22 that is individualized based on any received game input. As discussed below, the show robot 30 is controlled by a robot controller 40 of a robot control system 42. Moreover, the robot control system 42 is communicatively coupled to a game control system 44 (e.g., main control system) having a game controller 46, an AR control system 50 having an AR controller 52, and a media control system 54 having a media controller 56. In the illustrated embodiment, the robot controller 40 of the robot control system 42, the media controller 56 of the media control system 54, the AR controller 52 of the AR control system 50, and the game controller 46 of the game control system 44 each include at least one processor 60 (e.g., microprocessor), at least one memory device 62, and a wireless communication device 64. The processors 60 may each be any suitable processor that can execute instructions for carrying out the presently disclosed techniques, such as a general-purpose processor, system-on-chip (SoC) device, an application-specific integrated circuit (ASIC), a processor of a programmable logic controller (PLC), a processor of an industrial PC (IPC), or some other similar processor configuration. These instructions are encoded in programs or code stored in a tangible, non-transitory, computer-readable medium, such as the memory devices 62 and/or other storage circuitry or device. Further, via the wireless communication devices 64, each of the controllers 40, 46, 52, 56 may communicate with and provide signals to one another over a wireless network. However, in some embodiments, at least a portion of the controllers 40, 46, 52, 56 and/or the components coupled thereto may include wired connections that facilitate the present techniques.

Although discussed herein as including certain control systems that have certain components and perform certain actions, it should be understood that the various control systems 42, 44, 50, 54 of the attraction 8 may be subdivided into any suitable combinations, or, alternatively, embodied within a single control system. For example, the controllers 40, 46, 52, 56 may be combined within a single combined controller, individually supported by a respective single controller, or otherwise supported by any number of suitable computing devices. Indeed, all or a portion of the controllers 40, 46, 52, 56 may be virtual components of a single computer, automation controller, PLC, or the like. That is, one or multiple of the controllers 40, 46, 52, 56 may be virtual controllers, in some embodiments.

With attention first directed to the game control system 44, the game control system 44 may generally direct operation of remaining control systems 42, 50, 54 to coordinate delivery of a reactive game experience to the guests 22. For example, the reactive game experience may be provided as a scene in which the guests 22 are tasked with accomplishing one or multiple goals (e.g., launching a threshold number and/or combination of projectiles at the moving show robot 30, scoring points in a virtual board game experience). As illustrated, the ride vehicle 14 is fitted with at least one input device 70 (e.g., game input device) that is communicatively coupled to the game controller 46 to enable the guests 22 to provide game input to the game controller 46. The game controller 46 may be associated with or included within an enclosure 72 of the vehicle body 16 of the ride vehicle 14, in some embodiments. The ride vehicle 14 may include any suitable number, type, and/or combination of input devices 70, such as joysticks, wheels, pedals, buttons, switches, and so forth. Indeed, as particular examples, the input devices 70 may include a button disposed on a pivoting structure that resembles a virtual projectile launcher, a laser beam generator, or another suitable gameplay structure. Moreover, the input devices 70 of certain embodiments may be tethered to the ride vehicle 14 via a cable (e.g., power cable, communication cable) or, alternatively, may be handheld devices that are unattached from the ride vehicle 14 and wirelessly connected to the game controller 46. Indeed, in embodiments of the amusement ride 8 that exclude the ride vehicle 14, the guests 22 may hold portable input devices (e.g., portable venue-specific input devices, smart phones, smart glasses) that operate as the input devices 70 and/or may interact with an installed station having the input devices 70 permanently affixed near the show set 26. In any case, based on actuation and/or movement of the input devices 70, the input devices 70 may receive game input from the guests 22 and provide the game input to the game controller 46, thereby enabling the game controller 46 to coordinate the reactive game experience of the guests 22 based on the game input.

With respect to the AR control system 50, the guests 22 are illustrated with wearable visualization devices 74 that are operated based on control signals provided by the AR controller 52, in the illustrated embodiment. Indeed, the AR controller 52 is communicatively coupled to the wearable visualization devices 74 and the game controller 46. Therefore, the game controller 46 may transmit the game input to the AR controller 52, which generates AR objects that correspond to the game input for display via the wearable visualization devices 74. For example, in situations in which the game input is indicative of a projectile or laser beam being aimed at a target portion of the show set 26 or the show robot 30, the wearable visualization devices 74 may generate (e.g., render, display) AR objects that are overlaid onto a real world environment viewable by the guests 22, thereby enabling the guests 22 to visualize the associated game input within the real world environment. As another example, when playing a virtual board game with the show robot 30, the wearable visualization devices 74 may generate guest-selected AR objects that correspond to game pieces moving from the ride vehicle 14 to a board of a board game within the show set 26.

Although illustrated as separate from the game controller 46, it should be understood that other embodiments of the attraction 8 may include the AR controller 52 within the game controller 46, such as a software module therein. In such arrangements, the game controller 46 may directly control operation of the wearable visualization devices 74. In other embodiments, the AR control system 50 having the wearable visualization devices 74 and the AR controller 52 may be omitted. In some of these embodiments, the ride vehicle may include a physical output device (e.g., laser pointer, bubble generator, water gun, fan) to output real world physical effects (e.g., lights, bubbles, water streams, wind streams), which are detected by suitable sensors as the game input, to further contribute to guest enjoyment within the attraction 8.

Further, the media control system 54 of the attraction 8 includes at least one projector 80 that projection maps media (e.g., images, textures, expressions, effects) onto the show robot 30 and/or the show set 26 in which the show robot 30 is positioned. The projectors 80 are presently illustrated as externally-positioned, optical projecting devices that have lenses 82 and that are directly communicatively coupled to the media controller 56. In other embodiments, the projectors 80 may each be coupled to a network device (e.g., switch, hub) that is coupled to the media controller 56 to provide further streamlined communication between the components of the media control system 54. In the illustrated example, the projectors 80 include a robot projector 84 that projection maps a character appearance 86 onto at least a portion of an outer surface of a body 90 of the show robot 30, such as a head portion 92 of the body 90. The media controller 56 may utilize projection masking to identify an outline 94 of the portion of the body 90 that is to receive the character appearance 86. In some embodiments, the media controller 56 receives position, velocity, and/or acceleration information regarding the show robot 30 from the robot controller 40, thereby enabling the media controller 56 to efficiently projection map the selectively generated character appearance 86 onto the body 90 in a lifelike and realistic manner. Indeed, as discussed below, the media controller 56 may adjust a media projection target (e.g., the outline 94) for the robot projector 84 based on current and/or predictive (e.g., future) performances of the show robot 30. Other portions of the body 90 may be fitted with costume elements, such as clothes, hair, feathers, and so forth, in some embodiments.

Additionally, the present example of the projectors 80 includes background projectors 96 that may projection map scenery (e.g., grass 100, a tree 102), weather, animations, and so forth onto any portion (e.g., a floor 104, a backdrop 106) of the show set 26. The background projectors 96 may also display game effects that correspond to the game input, such as by illustrating water splashes on the backdrop 106 in response to the guests 22 aiming a bubble or water balloon at the backdrop 106. Because at least two background projectors 96 are disposed opposite the backdrop 106 from the show robot 30, projection areas 110 of the background projectors 96 may overlap. As such, the background projectors 96 may cooperate to provide media onto portions of the show set 26 that the show robot 30 may physically obstruct from one of the background projectors 96. The background projectors 96 may also cooperate with the robot projector 84 to provide the character appearance 86 to portions of the body 90 of the show robot 30, in some embodiments, thereby forming the character appearance 86 as a three dimensional appearance that is viewable from multiple perspectives or sides of the show robot 30.

Moreover, some embodiments may utilize a single projector 80 to projection map media onto the show robot 30 and the show set 26. Indeed, any suitable number of projectors 80 may be employed within the media control system 54 to contribute to the theme or reactive game experience of the attraction 8. It should be understood that the media control system 54 or the game control system 44 may additionally control any other suitable output devices, such as one or more stage lighting device 112 and/or one or more audio output device 114, to provide sensory outputs that coordinate with the projected media and the reactive game experience, in some embodiments. For example, the sensory outputs may include any suitable combination of visible, audible, tactile, and/or olfactory outputs produced by any corresponding output devices. In other embodiments, the output devices may be communicatively coupled to an output device controller, which is communicatively coupled to the game controller 46.

Returning to discussion of the show robot 30, the robot control system 42 also includes actuators 120 that are coupled to and/or disposed within the body 90 of the show robot 30 to control motion of at least a portion of the body 90. For example, the actuators 120 are communicatively coupled to the robot controller 40, which may instruct the actuators 120 to move the head portion 92, an arm portion 122, a torso portion 124, and so forth of the body 90 of the show robot 30. It should be understood that the body 90 of the show robot 30 may take any suitable form that contributes to the theme or the reactive game experience of the attraction 8. Indeed, although illustrated as having the body 90 and the character appearance 86 that resemble an owl, the show robot 30 may be shaped as any character, person, animal, animated object, and so forth, where the robot projector 84 provides the corresponding, reactive character appearance 86 to the body 90. Moreover, the actuators 120 that control movement of the body 90 may include servo motors, hydraulic cylinders, linear actuators, and so forth that dynamically manipulate the show robot 30 based on instruction from the robot controller 40. The actuators 120 may also control an actuatable motion base 126 that is disposed underneath or otherwise coupled to the show robot 30. In such embodiments, the actuatable motion base 126 may be designed to rotate, translate, or otherwise adjust a macroscopic position of the show robot 30 within the show set 26, such as by moving the show robot 30 relative to the floor 104.

As discussed in more detail below, the robot control system 42 directs the show robot 30 to interactively engage with the guests 22, who may be entertained via the reactive game experience supported by the attraction 8. For example, in some embodiments, the show robot 30 is positioned at an end portion of the amusement ride 10, such that the show robot 30 provides a finale scene to the guests 22. As will be understood, the robot controller 40 may include a dedicated game engine or game server that calculates dynamic motion profiles (e.g., performances, routines) for the show robot 30, based on any game input provided via the input devices 70. Indeed, upon determining that a game cycle (e.g., show cycle, ride cycle) associated with the ride vehicle 14 is initiated, the robot controller 40 may instruct the show robot 30 to initiate a baseline performance 130.

As illustrated in FIG. 1, the baseline performance 130 may be a predetermined sequence or routine of actions (e.g., positioning, motions) stored within the robot controller 40 that the show robot 30 realistically moves through in the absence of game input. That is, unless interacted with, the show robot 30 may present the same baseline performance 130 to each ride vehicle 14, where a duration of the baseline performance 130 is equal to a duration of the game cycle (e.g., before an end of game performance of the game cycle). However, as discussed below, the robot control system 42 may interactively respond to any received game input by instructing the show robot 30 to interrupt the baseline performance with a reactive performance, which is dynamically generated based on specific parameters of the game input received. Then, the show robot 30 may provide a connective performance that links an end point of the reactive performance back to the baseline performance, so that additional game input for prompting additional reactions or reactive performances may be received. As such, the attraction 8 having the show robot 30 provides an enjoyable, reactive gameplay experience, which may be highly engaging to the guests 22 and individualized for each ride through the amusement ride 10 or game cycle within the attraction 8.

Figure 2:
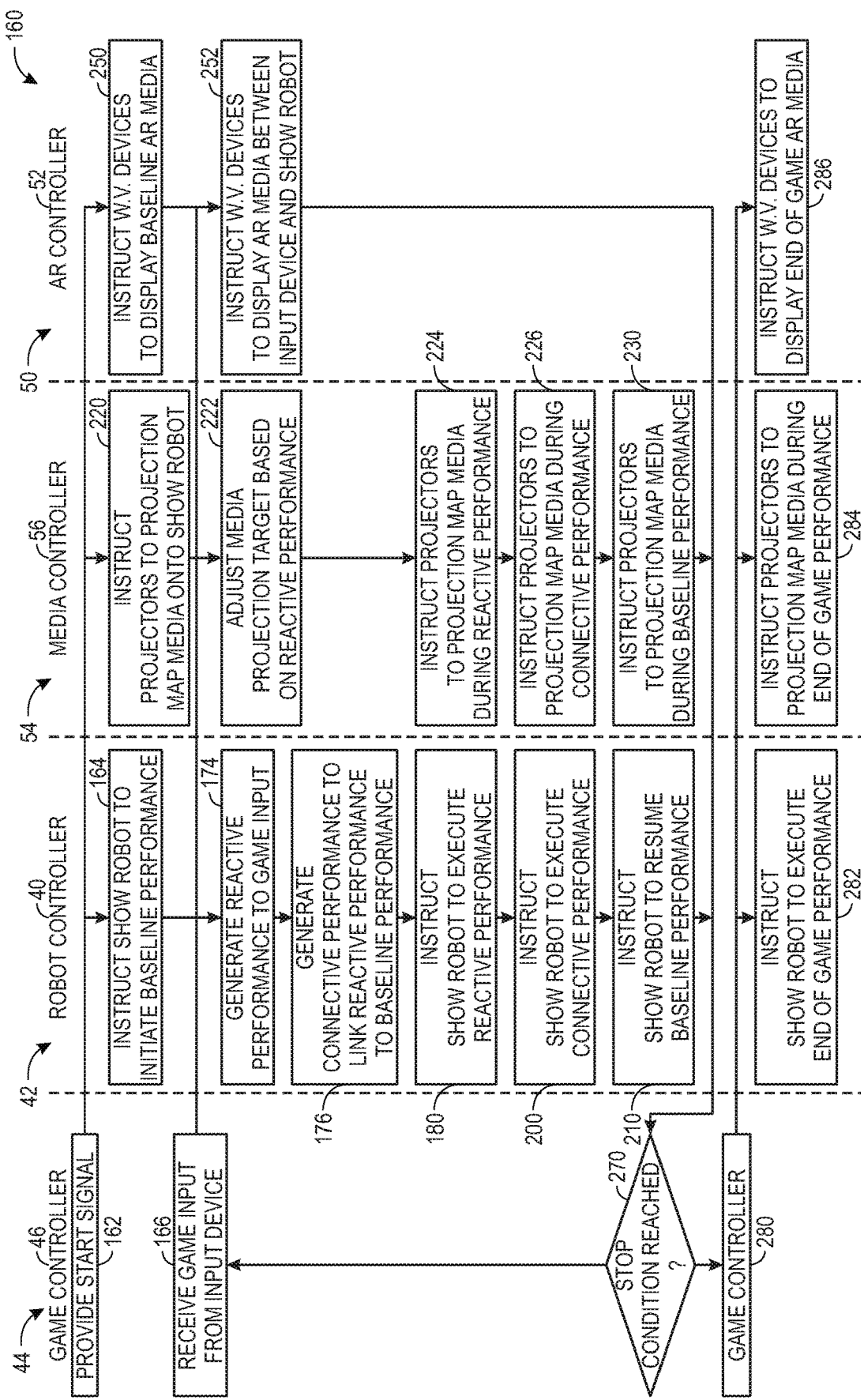
FIG. 2 is a flow diagram of an embodiment of a process by which multiple control systems of the amusement attraction interoperate to provide a reactive game experience via the show robot of FIG. 1, in accordance with embodiments of the present disclosure.

FIG. 2 is a flow chart illustrating a process 160 by which the controllers 40, 46, 52, 56 cooperate to provide the attraction 8 that features the reactive, projection-mapped show robot 30, which is discussed with reference to the amusement ride 10 introduced above. However, it is noted that the attraction 8 may take any other suitable form, including forms with different ride vehicles 14 or forms that exclude ride vehicles 14. As discussed in more detail below, the game controller 46 may be a primary or main controller that directs operation of remaining controllers 40, 52, 56 of the attraction 8. In other words, the remaining controllers 40, 52, 56 may adjust their operation based on control signals received from the game controller 46, in certain embodiments. As such, the process 160 is discussed with reference to the game controller 46 communicating with the robot controller 40, then the media controller 56, and then the AR controller 52. However, it should be understood that each of the controllers 40, 46, 52, 56 may be operating simultaneously to provide an immersive, reactive game experience to the guests 22.

Moreover, the steps illustrated in the process 160 are meant to facilitate discussion and are not intended to limit the scope of this disclosure, because additional steps may be performed, certain steps may be omitted, and the illustrated steps may be performed in an alternative order or in parallel, where appropriate. The process 160 may be representative of initiated code or instructions stored in respective non-transitory computer-readable mediums (e.g., the memory devices 62) and executed, for example, by the respective processors 60 of the corresponding controllers 40, 46, 52, 56. As noted above, it should also be understood that the controllers 40, 46, 52, 56 discussed herein may be embodied within any suitable number of processing devices, such as one, two, three, four, or more controllers that may communicate via any suitable wired and/or wireless network.

As presently recognized, the game control system 44 generally directs operation of the attraction 8 or the amusement ride 10 thereof to provide and preserve the reactive game experience for the guests 22, during their respective game cycle. Thus, the game controller 46 initiating the process 160 may start a game cycle by providing (block 162) a start signal to the remaining controllers 40, 52, 56. In some embodiments, the start signal is provided in response to a predetermined start condition being met, such as in response to the ride vehicle 14 reaching a particular point on the ride path 12 (e.g., as sensed by a sensor on the ride path 12), in response to the ride vehicle 14 moving within a threshold distance of the show set 26 (e.g., as sensed by a sensor on the show set 26), in response to a predetermined time interval between subsequent ride vehicles 14 elapsing, and so forth. Moreover, in certain attractions 8 without ride vehicles 14, the start signal for the game cycle may be provided based on a threshold time elapsing, based on detection of the presence of a guest, based on activation of a game cycle activation device (e.g., button, sensor that detects door opening), and so forth. Certain embodiments may also include a separate game cycle controller to issue the start signal in response to the suitable start condition being met.

With focus now turning to the robot control system 42, the robot controller 40 instructs (block 164) the show robot 30 to initiate the baseline performance 130, in response to receiving the start signal provided by the game controller 46. As discussed above with reference to FIG. 1, the show robot 30 may provide the baseline performance 130 by executing or performing a predetermined sequence or set of actions (e.g., motions, positions). Thus, the actuators 120 may move various portions of the body 90 of the show robot 30 in any suitable manner to emulate a desired character performing the baseline performance 130, which is generally performed when game input is not received. As such, the baseline performances 130 initially displayed to each ride vehicle 14 may be generally similar or identical (e.g., visually indistinguishable) to one another unless game input is received, in some embodiments. Moreover, some embodiments may instruct the show robot 30 to provide the baseline performance 130 for a threshold amount of time before the input devices 70 accept game input and/or before the game controller 46 transmits the game input to the robot controller 40, thereby enabling at least an initial portion of the baseline performance 130 to be executed to introduce the guests 22 to the reactive game experience.

Figure 3:
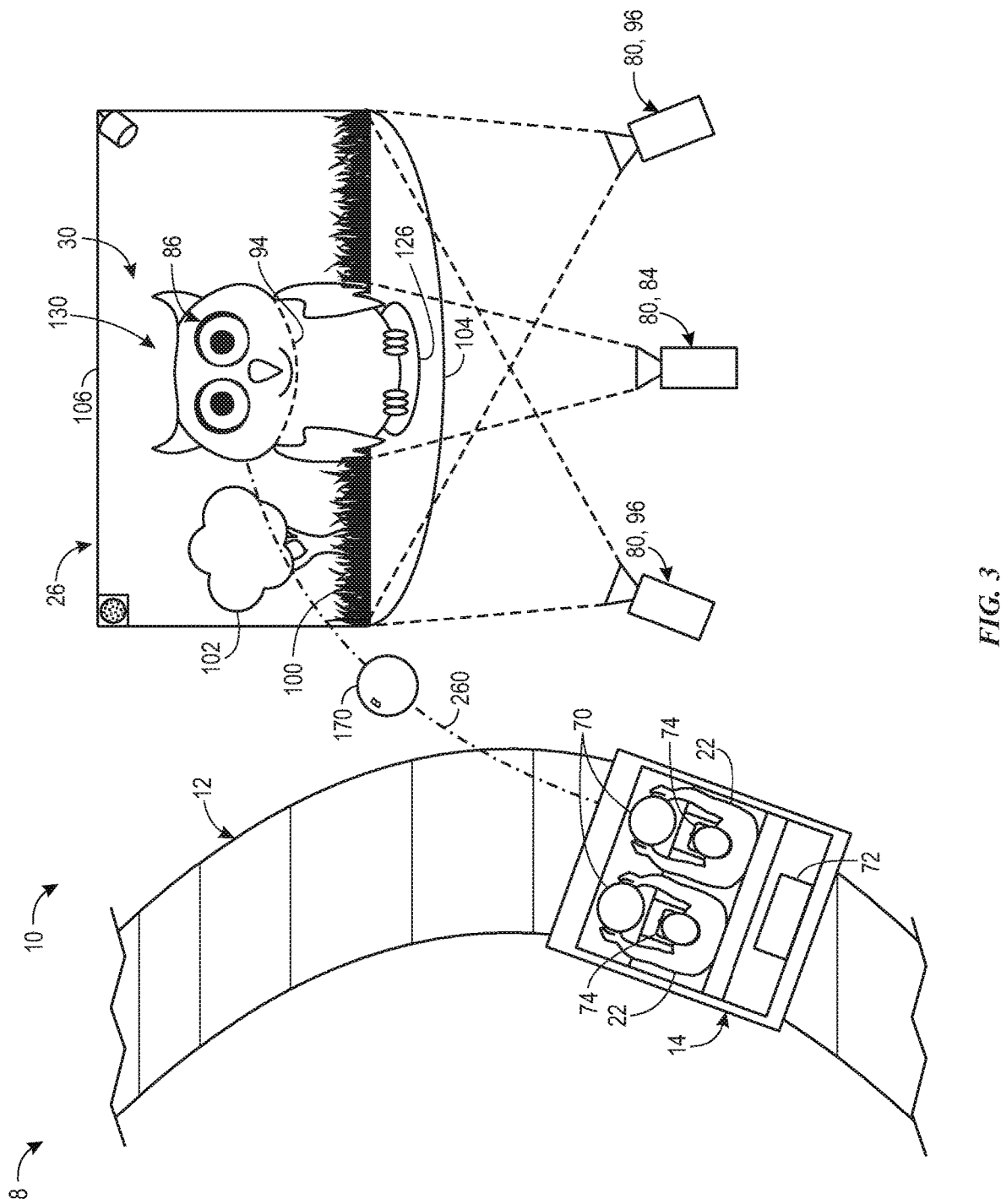
FIG. 3 is a schematic diagram illustrating an embodiment of the amusement attraction, in which game input provided via the input devices of FIG. 1 is directed toward the projection-mapped show robot and rendered via an augmented reality (AR) system, in accordance with embodiments of the present disclosure.

As mentioned, the attraction 8 includes the show robot 30 that is dynamically reactive to game input. Therefore, the process 160 includes the game controller 46 receiving (block 166) game input from at least one of the input devices 70. The game input may correspond to any suitable gameplay action within the attraction 8 or amusement ride 10, such as game input corresponding to launching a projectile at the show robot 30, moving a game piece in a virtual board game against the show robot 30, and so forth. Indeed, turning now to a particular, non-limiting example, FIG. 3 is a schematic illustration of the attraction 8 receiving game input while the show robot 30 is executing the baseline performance 130. As illustrated, the guests 22 actuate the input devices 70 to launch a virtual projectile object 170 (e.g., bubble, water balloon, food) at the show robot 30, which may be displayed via the wearable visualization devices 74 of the AR control system 50, as discussed below. The input devices 70 may enable the guests 22 to aim or steer the projectile AR object to the show robot 30. Moreover, some embodiments may enable the guests 22 to cooperate to provide the game input, such as with one guest 22 aiming and another guest 22 launching the virtual projectile object 170. As discussed below, the virtual projectile object 170 and/or any other suitable game input may be rendered by the AR control system 50, the media control system 54, or both.

Returning to the process 160 of FIG. 2, the robot controller 40 may receive signals indicative of the game input from the game controller 46 and generate (block 174) a reactive performance to the game input. For example, the robot controller 40 may include a dedicated game engine or game server that dynamically generates (e.g., computes) the reactive performance based on specific parameters of the game input. As recognized herein, the reactive performance may be designed to interrupt the baseline performance 130 with a reactive sequence of actions that is reactive to specific qualities and/or quantities of the game input. That is, the reactive performance may include an adjusted sequence of actions (e.g., different actions, different sequence of the actions) to be performed by the show robot 30 relative to the sequence of actions of the baseline performance 130. For example, the robot controller 40 may generate the reactive performance based on parameters of the game input including the particular guest 22, a type of the game input, a type of the input device 70 that provided the game input, a target location (e.g., of the show robot 30 and/or show set 26) selected or marked by the input device 70, the ride vehicle 14, an elapsed time, previously received game inputs within the game cycle, and/or other sensed parameters associated with the game input. In other words, the particular reactive performance may be generated ad hoc or on demand in response to the game input, in contrast to the predetermined and stored baseline performance 130. As one example, in response to a projectile being launched at a first targeted portion of the body 90 of the show robot 30, the show robot 30 may tilt in a first direction, while a projectile launched at a different, second targeted portion of the body 90 causes the show robot 30 to tilt in a second direction, different than the first direction.

The robot controller 40 may also generate (block 176) a connective performance that smoothly connects or links an end of the reactive performance back to the baseline performance 130. That is, the connective performance may include a sequence of connective actions that transition the show robot 30 from an end of the reactive performance back to the baseline performance. In some embodiments, the connective performance is generated in response to the reactive performance being generated, thereby enabling the robot controller 40 to efficiently link a start of the connective performance with an end of the reactive performance. Indeed, in some embodiments, the robot controller 40 may generate a combined reactive and connective performance that is responsive to received game input, while also returning the show robot 30 to the baseline performance 130. In such a case, the combined reactive and connective performance may also be referred to as the reactive performance that links a performance generated in response to the game input back to the baseline performance 130, without deviating from the present techniques. However, in other embodiments, the connective performance may be generated in response to the robot controller 40 receiving the game input, such that generation of the connective performance proceeds in parallel with generation of the reactive performance to reduce latency of the robot control system (e.g., in configurations of the robot controller 40 having a suitably high processing power).

Further, certain embodiments of the amusement attraction 8 may include a predetermined database of connective performances stored within the robot controller 40 and from which the robot controller 40 may select or identify a suitable connective performance based on the reactive performance and/or game input from which the reactive performance is based. In such cases, the predetermined database may include a large number (e.g., hundreds, thousands, hundred thousands) of connective performances, each including a respective initial connective action that the robot controller 40 may match with a final reactive action of the dynamically generated reactive performance, a respective final connective action that the robot controller 40 may match with the desired return point of the baseline performance 130, and one or multiple intermediate connective actions therebetween that visually link the respective initial and final connective actions. Such an arrangement may be computationally beneficial for robot controllers 40 having high storage capacity and/or limited computational power.

Moreover, the illustrated embodiment of the process 160 includes the robot controller 40 generating both the reactive performance and the connective performance before causing the show robot 30 to execute the reactive performance and the connective performance, examples of which are discussed below. Such a configuration may enable the show robot 30 to respond more quickly and realistically to the game input, compared to configurations of the robot controller 40 that cause the show robot 30 to execute the reactive performance before generating the connective performance. Indeed, continuing the process 160, the robot controller 40 may instruct (block 180) the show robot 30 to execute the reactive performance. For example, turning to FIG. 4, a reactive performance 190 is illustrated in which the show robot 30 is reacting to the game input. Indeed, the reactive performance 190 interrupts or replaces a portion of the baseline performance 130 discussed above, such that the show robot 30 is performing the reactive sequence of actions. In the illustrated, non-limiting example, the show robot 30 is tilting away from a target location 192 at which the virtual projectile object 170 is contacting the show robot 30 (e.g., a first action performed via the actuatable motion base 126), while a mouth 194 of the show robot 30 is opened (e.g., a second action performed via actuators 120 within the show robot 30). However, it should be understood that any suitable reactive performance 190 having any suitable number of actions may be performed. The reactive performance 190 may have a suitable, relatively short length (e.g., 5 seconds) that enables subsequent reactive performances 190 to be executed during the game cycle.

Thus, returning to FIG. 2, the robot controller 40 may instruct (block 200) the show robot 30 to execute the connective performance that smoothly connects an end of the reactive performance 190 to the baseline performance 130. In some embodiments, the connective performance transitions the show robot 30 back to a same point or interrupted action in the baseline performance 130 that was interrupted by the reactive performance 190. Alternatively, the connective performance may transition the show robot 30 to a subsequent point in the baseline performance 130, such as a later action or portion that is offset from the interrupted action by a length of the reactive performance 190 and the connective performance (e.g., a threshold time). As one possible example, FIG. 5 illustrates an embodiment of a connective performance 202 in which the show robot 30 has completed the reactive performance 190 and is executing a sequence of connective actions to transition back to the baseline performance 130. In the illustrated example, the show robot 30 has returned to its initial, upright position, thus enabling the show robot 30 to re-react to subsequent game input (e.g., by tilting, moving portions of the body 90, translating relative to the floor 104). In alternative embodiments that enable the guests 22 to play the virtual board game with the show robot 30, the reactive performance 190 may include the show robot 30 moving the arm portion 122 to place a game piece, while the connective performance 202 may include the show robot 30 moving its arm portion 122 back to its baseline position (e.g., initial position, home position).

Returning again to FIG. 2, the robot controller 40 continues the process 160 by instructing (block 210) the show robot 30 to continue the baseline performance 130. Indeed, an end of the connective performance 202 desirably transitions the show robot 30 back to the baseline performance 130, such that subsequent game input may be received and reacted to via corresponding reactive performances 190 and connective performances 202, during the game cycle. As discussed in more detail below, the game cycle may continue until the game controller 46 issues a stop signal to the remaining controllers 40, 52, 56 of the attraction 8.

With focus now turning to the media control system 54, the media controller 56 performing the process 160 may instruct (block 220) the projectors 80 to projection map media onto the show robot 30 executing the baseline performance 130 in response to the start signal provided by the game controller 46. Indeed, as discussed above, the robot projector 84 may provide the character appearance 86 onto the body 90 of the show robot 30 that is dynamically matched with the sequence of actions performed by the show robot 30. Additionally, the background projectors 96 may provide corresponding media onto the backdrop 106 and/or floor 104 to further enhance the attraction 8, in some embodiments. Moreover, in response to the game input that is received by the game controller 46 at block 166, the media controller 56 may adjust (block 222) a media projection target of the projectors 80 to correspond to the reactive performance 190 and the connective performance 202. That is, in response to the game input, the media controller 56 utilizing projection masking may update stored parameters representing the position, velocity, and/or acceleration of the outline 94 of the portion of show robot 30 that receives the character appearance 86 from the projectors 80. Moreover, certain embodiments of the media controller 56 may receive actuator information (e.g., position information, velocity information, acceleration information) associated with the actuators 120 of the show robot 30 executing the reactive performance 190 and/or the connective performance 202 from the robot controller 40. The actuator information may enable the media controller 56 to further refine the media projection target of the projectors 80 to precisely match an instantaneous, current state of the show robot 30, thereby reducing the potential for projected media to be misaligned relative to actual positioning of the show robot 30. The media controller 56 may therefore instruct (block 224) the projectors 80 to projection map corresponding media (e.g., character appearance 86, grass 100, tree 102) to the show robot 30 and the show set 26 during the reactive performance 190.

Figure 4:
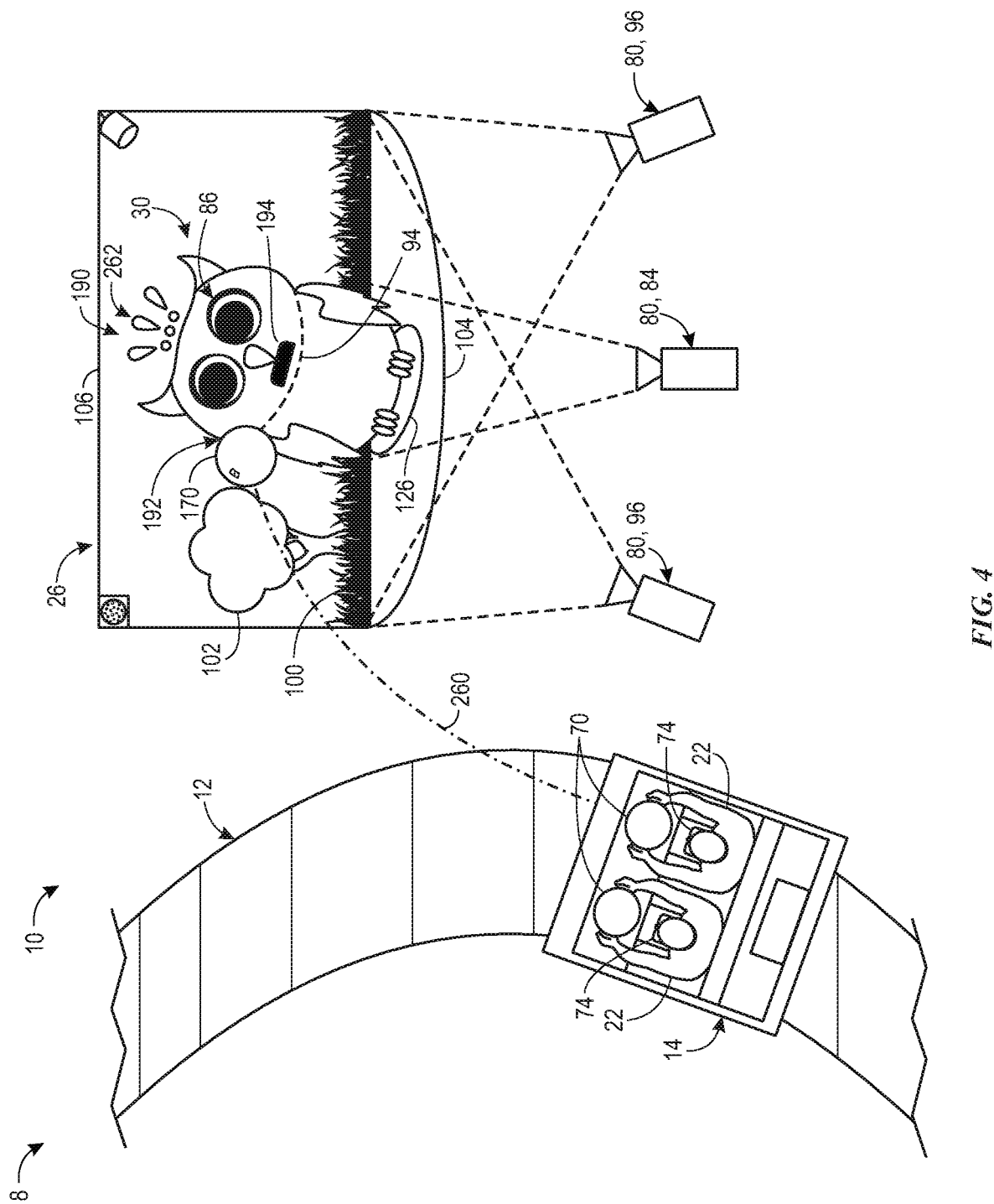
FIG. 4 is a schematic diagram illustrating an embodiment of the show robot executing a reactive performance to interrupt the baseline performance of FIG. 1 in response to the game input of FIG. 3, in accordance with embodiments of the present disclosure.

Indeed, as illustrated in FIG. 4, the projectors 80 may present reactive media, such as an adjusted expression including the mouth 194, onto the show robot 30 executing the reactive performance 190, where the outline 94 corresponding to the media projection target is adjusted relative to the baseline performance 130. Returning again to FIG. 2, the media controller 56 may also instruct (block 226) the projectors 80 to projection map corresponding media onto the show robot 30 and show set 26 during the connective performance 202, as illustrated in FIG. 5. Further, the media controller 56 may instruct (block 230) the projectors 80 to projection map the corresponding media onto the show robot 30 and show set 26 as the connective performance 202 transitions the show robot 30 back to the baseline performance 130. It should be understood that the media projection target of the projectors 80 may be updated or adjusted at any suitable time within the game cycle to enable the projected media to precisely align with the show robot 30, which may be reacting to the game input at any moment. Moreover, some embodiments of the attraction 8 may include the robot controller 40 transmitting position, velocity, and/or acceleration information regarding the performances of the show robot 30 to the media controller 56 to enable the projectors 80 to more efficiently projection map media onto the show robot 30.

With respect to the portion of the process 160 regarding the AR control system 50, it is presently recognized that the AR control system 50 may augment the reactive game experience by enabling the guests 22 to visualize interactions with the show robot 30 via AR objects overlaid onto the real world environment. Accordingly, in response to the start signal provided by the game controller 46, the AR controller 52 may instruct (block 250) the wearable visualization devices 74 to display baseline AR media and/or objects. The wearable visualization devices 74 may display AR effects surrounding the ride vehicle 14, the input devices 70, the show robot 30, and/or the show set 26, in some embodiments. As one particular example, the wearable visualization devices 74 may display an AR effect or glow around the input devices 70 to indicate the interactive nature of the attraction 8. Then, in response to receiving the game input from the game controller 46, the AR controller 52 may instruct (block 252) the wearable visualization devices 74 to display suitable AR media between the actuated input device 70 and the show robot 30. For example, as illustrated in FIG. 4 discussed above, the wearable visualization devices 74 may display the virtual projectile object 170 corresponding to the game input for view by the guests 22 within the real world environment. In some embodiments, supplemental AR objects, such as a path 260 or trace of the virtual projectile object 170 and/or effects 262 surrounding the show robot 30 may also be displayed in response to the game input.

To manage the game cycle of the reactive game experience illustrated in the process 160 of FIG. 2, the game controller 46 determines (block 270) whether at least one stop condition for the game cycle has been reached, such as based on game rules associated with the reactive game experience. As examples illustrated in FIG. 5, the stop condition may be reached when a status bar object 272 associated with the show robot 30 reaches a threshold (e.g., is filled above an upper threshold, is depleted below a lower threshold) in response to a suitable number and/or combination of game inputs, when a threshold time associated with a timer 274 has elapsed (e.g., after 1, 2, 3, 4, or 5 minutes), when the guests 22 achieve a particular goal (e.g., winning the virtual board game), and so forth. The status bar object 272, the timer 274, and/or any other elements associated with the stop condition may be presented to the guests 22 via the projectors 80 and/or the wearable visualization devices 74. Therefore, in response to determining that the stop condition is not reached, the game controller 46 continues to cause the show robot 30 to execute reactive performances 190 and connective performances 202 in response to receiving suitable game input, with the media control system 54 and the AR control system 50 supplementing the appearance of the attraction 8 and the amusement ride 10 therein. In some embodiments, a wait period (e.g., 2 seconds) may be enforced before subsequent game input is received and reacted to, thereby enabling the attraction 8 to present a smoothed reactive game experience in which a threshold portion of the baseline performance 130 is presented in between reactions to game inputs.

Alternatively, in response to determining that at least one stop condition is reached, the game controller 46 may provide (block 280) a stop signal to the remaining controllers 40, 52, 56, indicating a conclusion of the game cycle. In response to the stop signal, the robot controller 40 may instruct (block 282) the show robot 30 to execute an end of game performance (e.g., a farewell scene), the media controller 56 may instruct (block 284) the projectors 80 to projection map media onto the show robot 30 during the end of game performance, and the AR controller 52 may instruct (block 286) the wearable visualization devices 74 to display end of game AR media. In some embodiments, the particular end of game performance displayed is dependent on particular achievements of the guests 22 within the amusement ride 12, such that guests 22 who complete a certain goal are provided with an end of game performance that corresponds to completion of the goal. As such, after cooperating to present the end of game performance, the subsystems of the attraction 8 may pause their operations until the next game cycle begins.

Accordingly, technical effects of the disclosed attraction 8 include providing a reactive game experience to guests 22, who may be equipped with input devices 70 and wearable visualization devices 74, via a reactive, projection-mapped show robot 30. Multiple control systems of the attraction 8 may cooperate to facilitate presentation and execution of the reactive game experience, which begins with a baseline performance 130 of the show robot 30 initially presented to the guests 22. For example, after initiation of the baseline performance 130, the input devices 70 may transmit game input to a game controller 46 that monitors progression of a game cycle, according to suitable gameplay rules. Based on the game input relayed by the game controller 46, a robot controller 40 may instruct the show robot 30 or (actuators 120 thereof) to interrupt the baseline performance 130 with a reactive performance 190 that includes a sequence of reactive actions, which is responsive to the game input. Moreover, the robot controller 40 may further instruct the show robot 30 to execute a connective performance 202 that smoothly links a final action of the reactive performance 190 back to the baseline performance 130. As disclosed herein, projectors 80 may direct a reactive character appearance 86 to an outer surface of the show robot 30, while certain virtual objects corresponding to the game input are rendered for guest view via the wearable visualization devices 74. Until the game controller 46 indicates that the game cycle of the reactive game experience is concluded, the show robot 30 may dynamically interrupt the baseline performance 130 with instantaneously generated pairs of reactive performances 190 and connective performances 202. As such, the attraction 8 may deliver improved guest enjoyment via interaction with the show robot 30, which executes the particular performances that are generated in an efficient manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement attraction that provides a reactive game experience to a guest, the amusement attraction having a robot control system that comprises:
    a show robot; and
    a robot controller communicatively coupled to the show robot, wherein the robot controller is configured to:
        instruct the show robot to execute a baseline performance, which is predetermined and stored within the robot controller;
        receive game input from an input device;
        instruct the show robot to interrupt the baseline performance by executing a reactive performance comprising a sequence of reactive actions that is responsive to the game input;
        instruct the show robot to execute a connective performance that links an end of the sequence of the reactive actions back to the baseline performance; and
    a media control system that comprises at least one projector and a media controller communicatively coupled to the at least one projector, wherein the media controller is configured to:
        instruct the at least one projector to projection map a character appearance onto a body of the show robot during the baseline performance,
        receive position information, velocity information, acceleration information, or a combination thereof associated with the show robot executing the reactive performance from the robot controller, and
        adjust a media projection target of the at least one projector during the reactive performance in response to receiving the position information, the velocity information, the acceleration information, or the combination thereof.

2. The amusement attraction of claim 1, wherein the connective performance comprises a sequence of connective actions that transitions the show robot back to an interrupted action of the baseline performance.

3. The amusement attraction of claim 1, wherein the connective performance comprises a sequence of connective actions that transitions the show robot to a portion of the baseline performance that is a threshold time after an interrupted action of the baseline performance.

4. The amusement attraction of claim 1, wherein the robot controller is configured to generate the connective performance before instructing the show robot to interrupt the baseline performance.

5. The amusement attraction of claim 1, wherein the reactive actions of the sequence comprise positioning of the show robot, motions of the show robot, or a combination thereof that are dynamically generated based on parameters of the game input.

6. The amusement attraction of claim 5, wherein the parameters of the game input comprise a type of the game input, a type of the input device that provides the game input, a target portion of the show robot marked by the game input, or a combination thereof.

7. The amusement attraction of claim 1, wherein the show robot comprises a body and at least one actuator configured to move a portion of the body during the baseline performance, the reactive performance, the connective performance, or a combination thereof based on instructions from the robot controller.

8. The amusement attraction of claim 1, comprising:
a ride vehicle comprising a vehicle body, wherein the input device is coupled to the vehicle body; and
a game controller communicatively coupled to the input device and the robot controller, wherein the game controller is configured to receive the game input from the input device and provide the game input to the robot controller.

9. The amusement attraction of claim 1, comprising the input device, wherein the input device is communicatively coupled to the robot controller, wherein the input device comprises a virtual projectile launcher, and wherein the game input provided to the robot controller is indicative of the guest launching a virtual projectile object at a target portion of the show robot.

10. The amusement attraction of claim 9, comprising a wearable visualization device communicatively coupled to the input device, wherein the wearable visualization device is configured to render the virtual projectile object traveling from the input device to the target portion within a real world environment viewable by the guest.

11. An amusement ride for providing a reactive game experience, the amusement ride comprising:
a ride vehicle configured to transport a guest to a position for viewing a show set of the amusement ride, wherein the ride vehicle comprises an input device and a game controller communicatively coupled to the input device to receive game input therefrom;
a show robot disposed within the show set;
a robot controller communicatively coupled to the show robot and the game controller, wherein the robot controller is configured to:
instruct the show robot to initiate a baseline performance,
receive the game input from the game controller after the show robot initiates the baseline performance,
generate a reactive and connective performance that causes the show robot to deviate from the baseline performance, perform a sequence of reactive actions that is responsive to the game input, and return to the baseline performance, and
instruct the show robot to execute the reactive and connective performance; and
a media control system that comprises at least one projector and a media controller communicatively coupled to the at least one projector, wherein the media controller is configured to:
instruct the at least one projector to projection map onto a body of the show robot during the baseline performance,
receive position information, velocity information, acceleration information, or a combination thereof associated with the show robot executing the reactive and connective performance from the robot controller, and
adjust a media projection target of the at least one projector during the reactive and connective performance in response to receiving the position information, the velocity information, the acceleration information, or the combination thereof.

12. The amusement ride of claim 11, wherein the baseline performance includes a sequence of actions, and wherein the reactive and connective performance interrupts the sequence of the actions with the sequence of the reactive actions.

13. The amusement ride of claim 11, wherein the reactive and connective performance comprises a reactive performance that is individually generated based on the game input and a connective performance that links an end of the reactive performance back to the baseline performance.

14. The amusement ride of claim 11, wherein the game controller is configured to provide the game input to the media control system comprising the media controller and the at least one projector configured to projection map a character appearance onto the show robot, and wherein the media controller is configured to instruct the at least one projector to adjust the character appearance in response to receiving the game input.

15. A method of controlling a robot and media to provide a reactive game experience within an amusement ride, the method comprising:
instructing, via a robot controller the robot to execute a baseline performance in response to initiation of a game cycle associated with a ride vehicle of the amusement ride;
receiving, via the robot controller, game input from a game controller associated with the ride vehicle, wherein the game input corresponds to activation of an input device of the ride vehicle;
generating, via the robot controller, a reactive performance comprising a sequence of reactive actions in response to receiving the game input;
generating, via the robot controller, a connective performance that links an end of the sequence of the reactive actions back to the baseline performance;
instructing, via the robot controller, the robot to interrupt the baseline performance by executing the reactive performance followed by the connective performance;
instructing, via a media controller, at least one projector to projection map a character appearance onto the robot during the baseline performance,
receiving, via the media controller, position information, velocity information, acceleration information, or a combination thereof associated with the robot executing the reactive performance or the connective performance from the robot controller; and
adjusting, via the media controller, a media projection target of the at least one projector during the reactive performance or the connective performance in response to receiving the position information, the velocity information, the acceleration information, or the combination thereof.

16. The method of claim 15, wherein the reactive performance and the connective performance are generated simultaneously.

17. The method of claim 15, comprising:
receiving, via the robot controller, a stop signal from the game controller in response to a threshold time of the game cycle elapsing or in response to a game condition being satisfied; and
instructing, via the robot controller, the robot to execute an end of scene performance to indicate conclusion of the game cycle in response to the stop signal.

18. The method of claim 15, comprising transmitting, via the game controller, the game input to the media controller, wherein the media controller controls the at least one projector, based on the game input, to project a reactive character appearance corresponding to the game input onto an outer surface of the robot.

* * * * *